(12) United States Patent
Cheronneau et al.

(10) Patent No.: US 9,597,738 B2
(45) Date of Patent: Mar. 21, 2017

(54) MILLING/SURFACING METHOD AND DEVICE

(71) Applicant: RENAULT s.a.s., Boulogne-Billancourt (FR)

(72) Inventors: Gerard Cheronneau, Marcoussis (FR); Arnaud Baudry, Rosny sur Seine (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 102 days.

(21) Appl. No.: 14/171,103

(22) Filed: Feb. 3, 2014

(65) Prior Publication Data

US 2014/0147220 A1 May 29, 2014

Related U.S. Application Data

(63) Continuation of application No. 14/006,839, filed as application No. PCT/FR2012/050599 on Mar. 22, 2012, now abandoned.

(30) Foreign Application Priority Data

Mar. 22, 2011 (FR) .................... 11 52366

(51) Int. Cl.
*B23C 5/06* (2006.01)
*B23C 5/20* (2006.01)
*B23C 5/24* (2006.01)

(52) U.S. Cl.
CPC ............. *B23C 5/06* (2013.01); *B23C 5/241* (2013.01); *B23C 5/2472* (2013.01); *B23C 5/202* (2013.01);
(Continued)

(58) Field of Classification Search
CPC ......... B23C 5/202; B23C 5/207; B23C 5/241; B23C 5/2427; B23C 5/2444;
(Continued)

(56) References Cited

U.S. PATENT DOCUMENTS 2,495,091 A * 1/1950 Bradley .................. B23C 5/242
407/36
3,934,319 A * 1/1976 Schuler ......................... 407/113
(Continued)

FOREIGN PATENT DOCUMENTS

EP 0 095 945 12/1983
EP 0 870 563 10/1998
(Continued)

OTHER PUBLICATIONS

International Search Report Issued May 25, 2012 in PCT/FR12/050599 Filed Mar. 22, 2012.
(Continued)

*Primary Examiner* — Daniel Howell
*Assistant Examiner* — Yasir Diab
(74) *Attorney, Agent, or Firm* — Oblon, McClelland, Maier & Neustadt, L.L.P.

(57) ABSTRACT

A method for milling a planar surface, during which a milling cutter, an axis of rotation of which is perpendicular to a surface to be machined, is moved in a direction parallel to the plane of the surface, to machine the surface in a single machining operation, over a predetermined layer of material, using a single milling head, and the milling cutter, in a same axial position relative to the surface to be machined, simultaneously carries out rough working, at least one intermediate finishing operation, and a finishing operation over a same layer of material.

11 Claims, 2 Drawing Sheets

(52) U.S. Cl.
CPC .......... *B23C 5/2427* (2013.01); *B23C 5/2444* (2013.01); *B23C 2200/0455* (2013.01); *B23C 2200/20* (2013.01); *B23C 2200/208* (2013.01); *B23C 2210/285* (2013.01); *B23C 2215/24* (2013.01); *B23C 2220/605* (2013.01); *Y10T 407/1908* (2015.01); *Y10T 407/1912* (2015.01); *Y10T 407/1946* (2015.01); *Y10T 409/303808* (2015.01)

(58) Field of Classification Search
CPC .... B23C 2200/0477; B23C 2200/0455; B23C 2200/20; B23C 2200/208; B23C 2200/08
See application file for complete search history.

(56) References Cited

U.S. PATENT DOCUMENTS

| | | | | |
|---|---|---|---|---|
| 3,946,475 A * | 3/1976 | Hopkins | .......................... | 407/41 |
| 5,199,827 A * | 4/1993 | Pantzar | .......................... | 407/42 |
| 5,667,343 A * | 9/1997 | Hessman et al. | .............. | 407/36 |
| 5,718,540 A * | 2/1998 | Satran et al. | .................... | 407/42 |
| 5,967,705 A | 10/1999 | Wermeister | | |
| 6,079,912 A | 6/2000 | Rothballer | | |
| 7,163,360 B2 * | 1/2007 | Toyose | ............................ | 407/36 |
| 7,547,164 B2 * | 6/2009 | Hessman | ...................... | 407/113 |
| 2003/0002929 A1 * | 1/2003 | Nagashima | .................... | 407/40 |
| 2007/0041798 A1 * | 2/2007 | Nasu et al. | ................... | 407/114 |
| 2007/0071559 A1 * | 3/2007 | Koskinen | ................ | B23B 27/16 407/34 |
| 2010/0150671 A1 * | 6/2010 | Oprasic et al. | ................. | 407/42 |
| 2010/0266353 A1 * | 10/2010 | Zitzlaff et al. | ................ | 407/113 |

FOREIGN PATENT DOCUMENTS

| | | |
|---|---|---|
| EP | 0 879 111 | 11/1998 |
| FR | 2 894 497 | 6/2007 |
| GB | 2 405 365 | 3/2005 |
| JP | 52 069087 | 6/1977 |
| SU | 1479210 A1 * | 5/1989 |
| SU | 1634394 A1 * | 3/1991 |

OTHER PUBLICATIONS

French Search Report issued Oct. 31, 2011 in FR 11 52366 Filed Mar. 22, 2011.

* cited by examiner

MILLING/SURFACING METHOD AND DEVICE

CROSS-REFERENCE TO RELATED APPLICATIONS

This application is a continuation of U.S. application Ser. No. 14/006,839 filed Sep. 23, 2013. U.S. application Ser. No. 14/006,839 is a U.S. National Stage of PCT/FR12/050599 filed Mar. 22, 2012, the entire contents of both of which are incorporated herein by reference, and claims the benefit of priority under 35 U.S.C. §119 from French Application No. 11-52366 filed Mar. 22, 2011.

BACKGROUND

The present invention relates to a method for milling a planar surface and a milling tool for implementing such a method.

The invention relates more particularly to a method for milling a planar surface, according to which a milling cutter, the rotation axis of which is perpendicular to the surface to be machined, is moved in a direction parallel to the plane of the surface so as to machine the latter in a single machining operation to a predetermined material thickness by means of a single milling head.

A favored, but nonlimiting, application thereof is in the machining of an internal combustion engine casing upper face.

A casing upper face is generally machined with the aid of a milling cutter which is moved horizontally over said upper face. Machining is broken down into a number of operations, including a first rough machining step, during which the material is removed to a first thickness, and one or more finish machining steps, during which the rough-machined surface is successively machined.

Milling cutters called "stepped" milling cutters are known, comprising a rotation axis perpendicular to the surface to be machined, an upper row of edges distributed around a first circumference and a second, lower row of cutting edges distributed around a second circumference which is axially offset with respect to the first circumference. The two rows of edges are coaxial and offset both axially and radially. The milling cutter carries out the rough machining step and the finish machining step by machining the surface of the casing at two different heights during a single machining operation.

In another type of milling cutter, called a "spiral milling cutter", the edges are arranged in a spiral shape around the body of the milling cutter, with an axial and radial offset between each edge. During machining, each cutting edge machines a portion of the part at a different axial height. The overall depth of pass of the tool is thus distributed between the different edges of the tool. This arrangement makes it possible to increase the thickness removed in a single tool passage. However, it reduces the service life of the tool and there is a significant risk of scratches on the machined surface.

BRIEF SUMMARY

The present invention proposes a different arrangement of the cutting edges, making it possible to remedy the above-mentioned drawbacks, by virtue of a new milling method.

It provides that the milling cutter simultaneously carries out, in the same axial position with respect to the surface to be machined, a rough machining operation, at least one intermediate finish machining operation, and a finish machining operation, to the same material thickness.

The tool proposed has in particular a number of sets of cutting edges which are offset radially while being arranged over one and the same axial sector of the tool. All of the blades machine the same material thickness when the milling cutter is moved parallel to the surface to be machined.

BRIEF DESCRIPTION OF THE DRAWINGS

Further features and advantages of the present invention will become more clearly apparent from the following description of a nonlimiting embodiment thereof, with reference to the appended drawings, in which.

DETAILED DESCRIPTION

Figure 1:
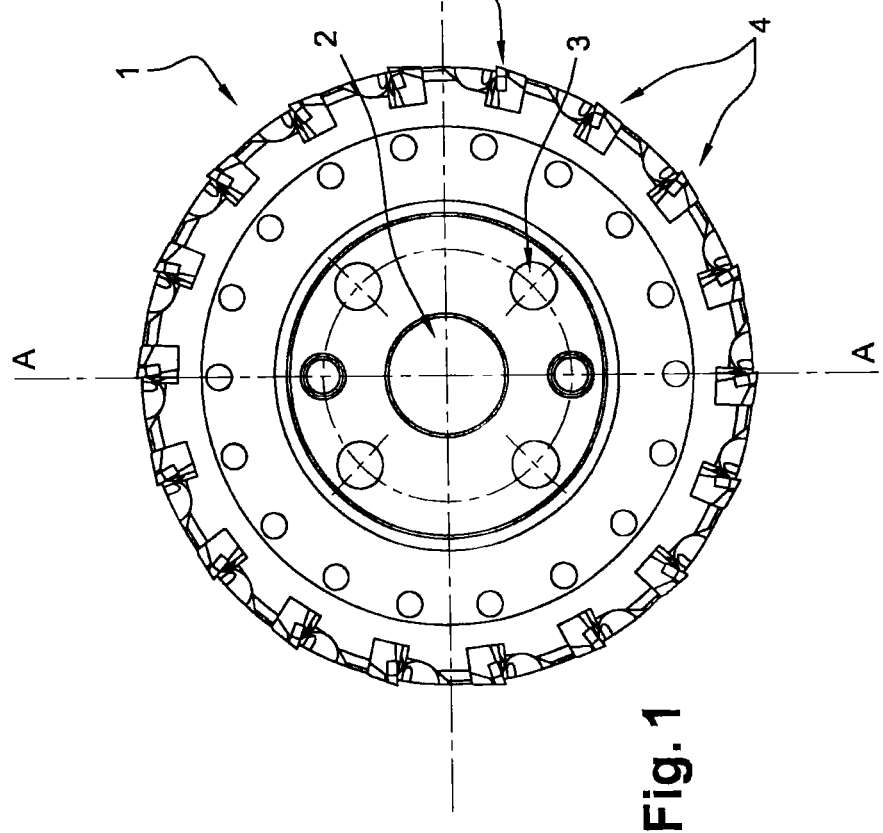
FIG. 1 is a view from below of the proposed milling cutter.

The milling tool illustrated in the figures has a milling cutter body 1, the rotation axis of which is always perpendicular to the machined surface during the milling operation. It has a number of sets of radially offset cutting edges. FIG. 1 shows the tool body 1, the through-passage hole 2 for the centering pin of the milling cutter (not shown), the through-passage holes 3 for the screws for assembling the milling cutter body 1 on its mount (not shown), and the set of cutting cartridges 4 distributed around the circumference of the tool body 1.

Figure 2:
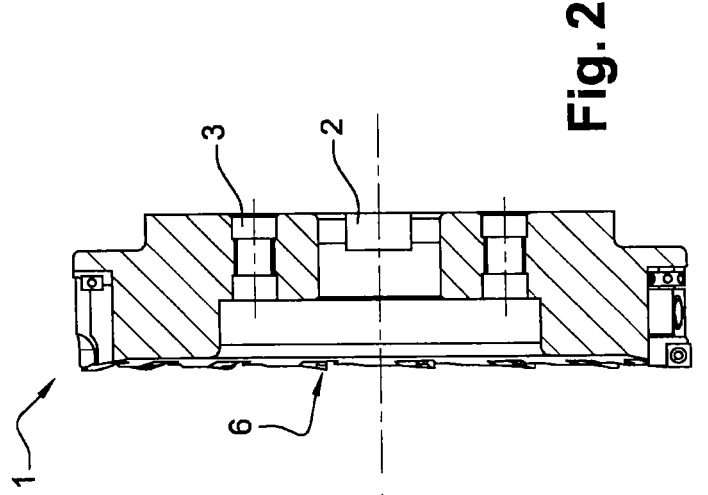
FIG. 2 is a section along A-A in FIG. 1.

These elements can also be seen in the section in FIG. 2, which shows the flushness of the blades, or cutting tips 6, on the base of the tool body 1.

Figure 3:
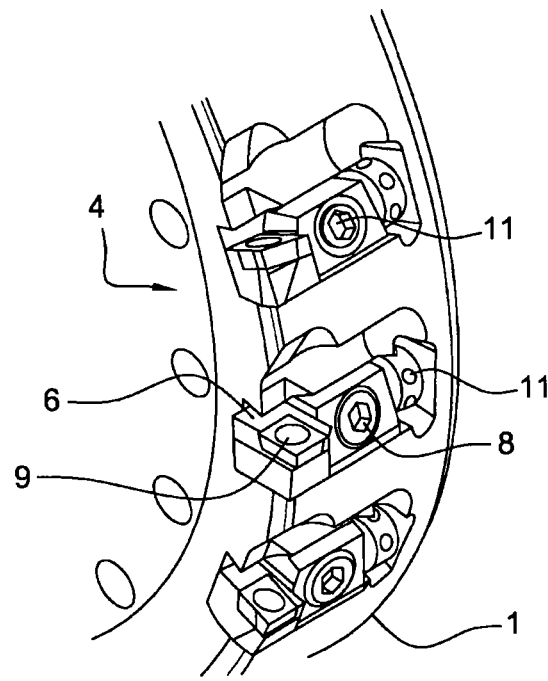
FIG. 3 shows the arrangement of cutting cartridges.

The detail in FIG. 3 reveals the arrangement and fastening of the tips 6 on the cartridges 4. The cartridges 4 are clamped on the tool body 1 by clamping screws 8. The tips 6 are clamped on the cartridge 4 by clamping screws 9 and their position is adjustable thereon by virtue of clamping screws (not shown), the insertion holes 11 of which can be seen.

The cutting edges 7 are the working edges of the removable tips 6, the position of which on the tip-holder cartridges 4 is adjustable, the position of said tip-holder cartridges 4 on the tool body 1 in turn being adjustable.

Figure 4:
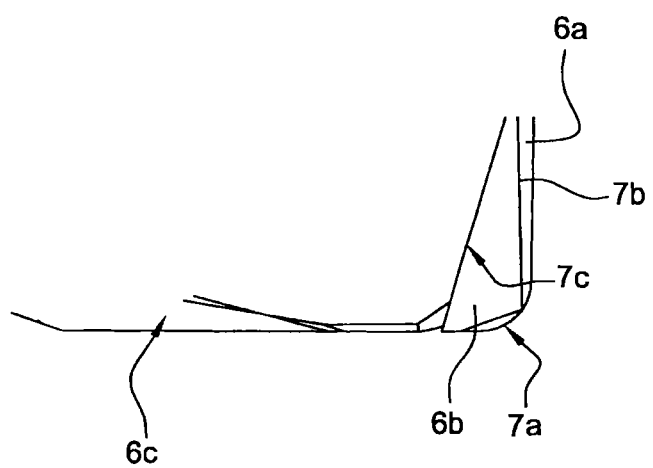
FIG. 4 illustrates the tiered arrangement of the cutting edges.

FIG. 4 shows three successive tips 6a, 6b, 6c in projection in one and the same diametral plane of the tool. The edges 7a, 7b, 7c thereof overlap in a tiered manner over their entire cutting height. The tool has a number of identical sets of cutting edges which are offset radially from one another within a single set. However, as indicated below, all of the edges 7a, 7b, 7c are arranged over one and the same axial sector of the tool so as to jointly machine the same material thickness when the milling cutter is moved parallel to the surface to be machined. In the set of three tips 6a, 6b, 6c shown in projection in one and the same diametral plane of the tool in FIG. 4, the tip 6a is the first to machine the material (if it is assumed that the rotation of the tool drives them toward the rear of the projection plane). It thus carries out the rough machining operation. The intermediate tip 6b, which is slightly set back toward the inside with respect to the first tip, carries out an intermediate finish machining operation. The third tip 6c, which is set back with respect to the previous tip, carries out the actual finish machining operation.

The three tips 6a, 6b, 6c of FIG. 4 form a set of three tips. It is also possible for the three tips of the set to be in a different arrangement: 6a, 6c, 6b. The same set of tips can be found a number of times around the circumference of the tool. In the nonlimiting exemplary embodiment of the invention described above, the set of tips comprises three tips. Without departing from the scope of the invention, it is possible, however, to provide a smaller number of tips per set (but at least two), or a greater number of tips, for example four, so as to carry out no, or a number of, intermediate finish machinings between the rough machining and the last finish machining. In any case, the tips are distributed regularly around the circumference of the tool in at least two successive and identical sets. Each first edge, with respect to the direction of rotation of the tool, is a rough machining edge, and the following edges are offset successively toward the outside in the radial direction, so as to progressively machine the same material thickness.

The number of cartridges, the number of tips per set and the number of sets of tips can vary. In any case, the tool comprises a number of sets of tips (and thus cutting edges) over one and the same diameter, that is to say in the same axial position on the tool body. The sets are distributed regularly around the circumference: three identical sets of edges each occupy a sector of 120° around the circumference of the tool body, and four sets occupy sectors of 90°.

In summary, the milling tool proposed has a number of identical sets of cutting edges which are radially offset from one another within one and the same set, with the same axial position on the tool. The milling cutter simultaneously carries out, in the same axial position with respect to the surface to be machined, a rough machining operation, at least one intermediate finish machining operation, and a finish machining operation, to the same material thickness. This tool is thus very different from the stepped milling cutter systems or spiral milling cutter systems mentioned above, in which the edges are axially offset on the tool body.

The milling method implemented with this tool is particularly effective since the milling cutter can simultaneously carry out, in the same axial position with respect to the surface to be machined, a rough machining operation, at least one intermediate finish machining operation, and a finish machining operation, to the same material thickness. As indicated above, a favored, but nonlimiting, application of this described tool and the described method is in the machining of an internal combustion engine casing upper face. Indeed, the invention has the same advantage for machining any planar metal surface, made of a single or two materials, belonging to a heat engine or any other mechanical member.

The invention claimed is:

1. A method for milling a planar surface, comprising:
moving a milling cutter, a rotation axis of which is perpendicular to a surface to be machined, in a direction parallel to a plane of the surface so as to machine the surface to be machined in a single machining operation to a predetermined material thickness by a single milling head including two or more of sets of cutting tips distributed around the milling head, each of the sets including a first tip having a first cutting edge, a second tip having a second cutting edge, and a third tip having a third cutting edge, the cutting edges being offset radially with respect to one another at a same axial position on the milling cutter; and
the milling cutter simultaneously carrying out, in a same axial position with respect to the surface to be machined, a rough machining operation via the first tip, at least one intermediate finish machining operation via the second tip, and a finish machining operation via the third tip, to a same material thickness.

2. A cylindrical milling tool for milling a planar surface, comprising:
a tool body; and
two or more sets of cutting tips attached to the tool body, each of the sets including a first tip having a first cutting edge, a second tip having a second cutting edge, and a third tip having a third cutting edge, the cutting edges being offset radially with respect to one another at a same axial position on the milling tool, the sets being distributed around a circumference of the milling tool to jointly machine a same material thickness when the milling tool is moved parallel to the surface to be machined.

3. The milling tool as claimed in claim 2, wherein the first and second cutting edges overlap in a tiered manner over their entire cutting height, in projection in a diametral plane of the milling tool.

4. The milling tool as claimed in claim 3, wherein the first edge of the first tip of each of the sets, as seen in a direction of rotation of the milling tool, is a rough machining edge, and the second edge of the second tip of each of the sets is offset successively toward an outside in a radial direction of the milling tool, to progressively machine the same material thickness.

5. The milling tool as claimed in claim 2, wherein the first cutting edge of the first tip of each the sets is positioned to carry out rough machining and the second cutting edge of the second tip of each of the sets is positioned to carry out finish machining of the milling.

6. The milling tool as claimed in claim 2, wherein the cutting tips are removable tips inserted into tip-holder cartridges of the tool body.

7. The milling tool as claimed in claim 6, wherein a position of the cutting tips on the cartridges is adjustable.

8. The milling tool as claimed in claim 2, wherein the third tip is positioned radially between the first tip and the second tip.

9. The milling tool as claimed in claim 8, wherein the first cutting edge of the first tip of each the sets is positioned to carry out rough machining, the third cutting edge of the third tip of each the sets is positioned to carry out intermediate finish machining, and the second cutting edge of the second tip of each of the sets is positioned to carry out finish machining of the milling.

10. The milling tool as claimed in claim 2, wherein the first cutting edge, the second cutting edge, and the third cutting edge each forms a different angle with a plane parallel to the surface to be machined.

11. The milling tool as claimed in claim 2, wherein the first cutting edge forms an angle with a plane parallel to the surface to be machined that is different than an angle formed by the second cutting edge with the surface to be machined.

* * * * *